United States Patent
Andreoli-Fang et al.

(10) Patent No.: US 9,503,206 B2
(45) Date of Patent: *Nov. 22, 2016

(54) MULTI-TIER POLLING

(71) Applicant: Cable Television Laboratories, Inc., Louisville, CO (US)

(72) Inventors: Jennifer Andreoli-Fang, Boulder, CO (US); Luis Alberto Campos, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 609 days.

This patent is subject to a terminal disclaimer.

(21) Appl. No.: 13/762,776

(22) Filed: Feb. 8, 2013

(65) Prior Publication Data

US 2013/0155854 A1 Jun. 20, 2013

Related U.S. Application Data

(63) Continuation of application No. 12/826,889, filed on Jun. 30, 2010, now Pat. No. 8,385,313.

(60) Provisional application No. 61/266,653, filed on Dec. 4, 2009.

(51) Int. Cl.
| | |
|---|---|
| *H04L 12/28* | (2006.01) |
| *H04J 4/00* | (2006.01) |
| *H04J 3/16* | (2006.01) |
| *H04L 12/919* | (2013.01) |
| *H04J 1/16* | (2006.01) |

(52) U.S. Cl.
CPC .............. *H04J 4/00* (2013.01); *H04J 3/1647* (2013.01); *H04L 12/2801* (2013.01); *H04L 47/765* (2013.01); *H04J 3/1694* (2013.01)

(58) Field of Classification Search
USPC ........ 370/346, 430, 450, 457; 270/346, 430, 270/450, 457
See application file for complete search history.

(56) References Cited

U.S. PATENT DOCUMENTS

| | | | | |
|---|---|---|---|---|
| 4,625,308 | A * | 11/1986 | Kim | H04B 7/2123 370/321 |
| 4,680,753 | A | 7/1987 | Fulton | |
| 4,829,297 | A | 5/1989 | Ilg | |
| 5,434,861 | A | 7/1995 | Pritty | |
| 5,818,828 | A * | 10/1998 | Packer | H04B 1/713 370/346 |
| 7,093,989 | B2 * | 8/2006 | Walmsley et al. | 400/62 |
| 7,711,387 | B2 | 5/2010 | Bowen | |
| 7,822,862 | B2 * | 10/2010 | Slater | G06F 11/3433 709/203 |
| 2001/0038620 | A1 * | 11/2001 | Stanwood | H04W 72/10 370/336 |
| 2003/0081588 | A1 | 5/2003 | Simbirski | |
| 2005/0174938 | A1 * | 8/2005 | Richardson | H04Q 11/0478 370/230.1 |

* cited by examiner

*Primary Examiner* — John Pezzlo
(74) *Attorney, Agent, or Firm* — Great Lakes Intellectual Property, PLLC

(57) ABSTRACT

A polling arrangement where polling frequency and/or rates may be adjusted according to activities of end stations or other elements being polled. The ability to adjust the polling activities may be used to facilitate reducing or otherwise controlling network resources allocated to the supporting the polling or other messaging depending operations.

20 Claims, 3 Drawing Sheets

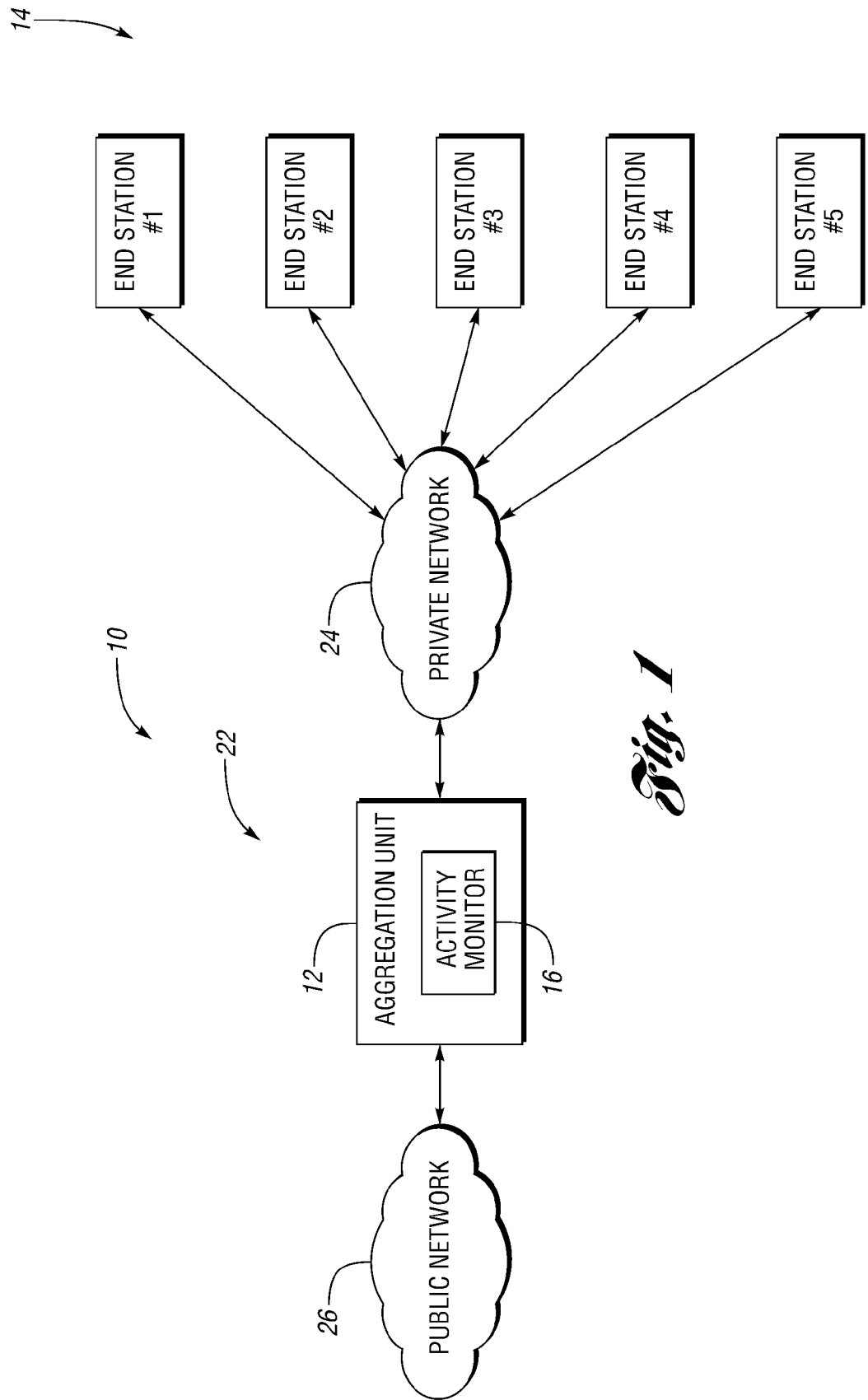

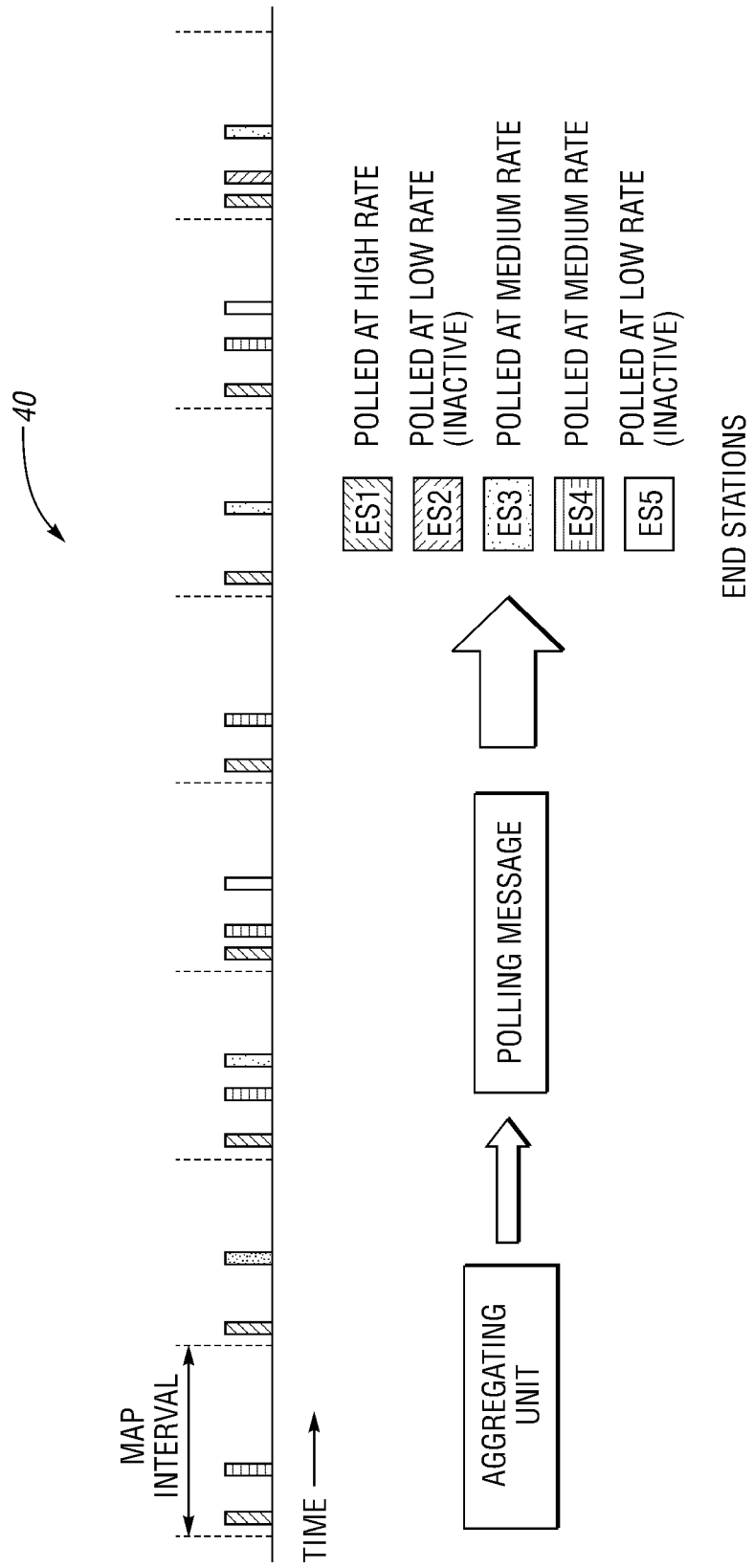

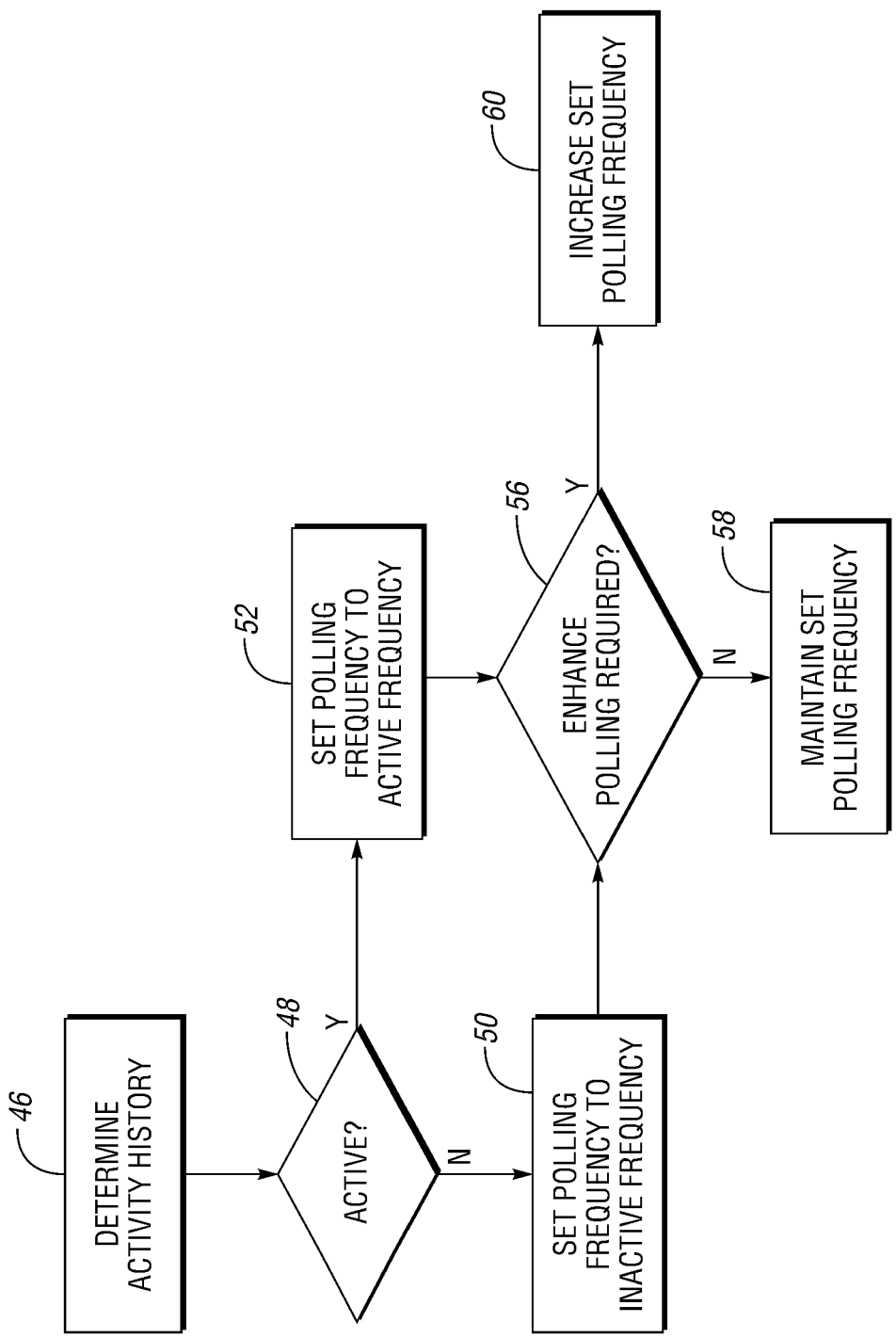

MULTI-TIER POLLING

CROSS-REFERENCE TO RELATED APPLICATIONS

This application is a continuation of U.S. application Ser. No. 12/826,889 filed Jun. 30, 2010, now U.S. Pat. No. 8,385,313, which claims the benefit of provisional application 61/266,653, filed Dec. 4, 2009, the disclosures of which are hereby incorporated in their entireties by reference.

TECHNICAL FIELD

The present invention relates to the allocation of network space, such as but not limited to the allocation of network space to support polling related activities of the type where end stations may be polled in order to request use of network space.

BACKGROUND

A network may be configured to transmit data within a range of frequency, which is commonly referred to as the bandwidth of the network. Within that frequency range, minislots, data slots, data units or other transmission units may be used to represent portions of the frequency used at a particular time to support transmission of a particular piece of data. The size of the minislots may be quantified in bits and/or bytes, e.g., see a minislot defined according to the Data Over Cable Service Interface Specification (DOCSIS). The number of minislots available at a particular instance in time may be used to define the network space of the network, i.e., the amount of data transfer the network can support at any one particular instance in time.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

FIG. 1 illustrates a multi-tiered polling system in accordance with one non-limiting aspect of the present invention;

FIG. 2 illustrates a polling schedule in accordance with one non-limiting aspect of the present invention; and FIG. 3 illustrates a flowchart of a multi-tiered polling method in accordance with one non-limiting aspect of the present invention.

DETAILED DESCRIPTION

FIG. 1 illustrates a multi-tiered polling system 10 in accordance with one non-limiting aspect of the present invention. The system 10 includes an aggregating unit 12 operable to dynamically poll one or more end stations 14 according to information provided from an activity monitor 16 regarding transmission activities of the end stations 14. The aggregating unit 12 may be operable to poll each end station 14 individually and adaptively such that polling messages or other types of polling related transmissions may be individually communicated from the aggregating unit 12 to selective ones of the end stations 14 at selective polling intervals. One non-limiting aspect of the present contemplates relying on this adaptive polling capability to facilitate management of network space.

The aggregating unit 12 may be any type of device operable to facilitate allocating resources of a network 22 used to transmit data from the end stations 14. The network 22 is labeled to include a private network 24 and a public network 26. The private network 24 may be used to designate a capability to support private communications between the aggregating unit 12 and the ends stations 14, 16, 18, such as over a closed network or a private virtual network. The communications may be executed through out-of-band (OOB) messaging or other messaging protocols between the aggregating unit 12 and the end stations 14. The public network 26 may be used to designate the Internet or other less secure or non-proprietary networks. The end stations 14 may transmit data according to the OOB or other private protocol, such as to transmit polling related responses/requests, and/or according to other protocols, such as to support IP related communications over the public network.

The aggregating unit 12 is shown as a gateway between the public and private networks 24, 26 for exemplary purposes. The aggregating unit 12 need not act as a gateway and the present invention is not intended to be limited to the aggregating unit 12 operating to support communications between public and private networks 24, 26. The present invention contemplates its use in many environments where it may be desirable to manage network space by adapting polling or other data intensive operations according to operating activities of the end stations 14. To this end, the aggregating unit 12 and the end stations 14 may correspond with any type of electronic device and/or logically executing unit and the network 22 may corresponding with any type or combination of wireline and wireless networks.

The present invention is predominately described with respect to a cable television related configuration in that the private network 24 may correspond with a wireline, cable network provided to a subscriber's home where the end stations 14 may correspond with a cable modem, media terminal adaptor (MTA), settop box (STB), television, or other device desiring data communications over one or more of the networks 24, 26, such as according to communications executed according to the Data Over Cable Service Interface Specification (DOCSIS). Of course, the present invention is not limited to cable related services or cable dependent communications and fully contemplates its application within non-cable environments.

One or more of the end stations 14 may be provided in a subscriber's home, or elsewhere in the event the end station 14, 16, 18 is a mobile device (e.g., pda, mobile phone, netbook, tablet, etc.), such that it may be operable to provide or otherwise facilitates access to any number or type of services, such as but not limited to Voice over Internet Protocol (VoIP), channel surfing (e.g., changing television channels tuned to over a QAM or IP signaling stream), and file upload/download through P2P or other operations. These services are highlighted since the services are sensitive to temporal inconsistencies, require stringent adherence to properly scheduled data transmissions, and require temporally varying amounts of network space.

One non-limiting aspect of the present invention contemplates managing allocation of network space by controlling a frequency at which the end stations are polled. The network space for exemplary purposes may be defined to correspond with any network or system resource consumed in facilitating data transfer. The network 22 may be configured to transmit data within a range of frequency, which is commonly referred to as the bandwidth of the network. Within that frequency range, minislots, data slots, data units or other transmission units may be used to represent portions of the frequency used at a particular time to support transmission of a particular piece of data. The size of the minislots may be quantified in bits and/or bytes as described in U.S. patent application Ser. No. 12/827,496 entitled System and Method of Decoupling Media Access Control (MAC) and Physical (PHY) Operating Layers, filed Jun. 30, 2010, the disclosure of which is hereby incorporated by reference in its entirety.

The number of minislots available at a particular instance in time may be used to define the network space of the network 22, i.e., the amount of data transfer the network can support at any one particular instance in time. The aggregating unit 12 may be configured for managing the amount of network space consumed supporting polling operations according to operating activities of the end stations 14. This, for example, may be facilitated by reducing or eliminating unnecessary polling of the end stations 14. The polling may be of the type that requires a polling message to be transmitted to each station 14. The receiving end station 14 may then be required to respond to the polling message with a response message that indicates a desire to transmit data, referred to as a transmission request, or a response message that indicates no need to transmit data. Optionally, the end station 14 may not be required to response to the polling message if data transmission is not request.

The polling of each end station 14 requires transmission of at least the polling message and in some cases transmission of the response message, i.e., either requesting network space to transmit data or to confirm that data transfer is not requested. Each of the messages consumes network space since the transmission thereof requires one or more minislots to support delivery over the network 22. The present invention is able to conserve network space by managing the polling frequency and/or at which rate each end station 14 are each individually transmitted a polling message. This allows the present invention, for example, to dynamically adapt the polling frequency according to whether each end station 14 is likely to request data transmission, e.g., to transmit less polling messages when the end stations 14 are unlikely to request data transmission.

FIG. 2 illustrates a polling schedule 40 in accordance with one non-limiting aspect of the present invention. The polling schedule 40 illustrates a frequency rate at which each of the five illustrated end stations 14 are transmitted a polling message from the aggregating unit 12 (each polling message is shown with a corresponding rectangular block shaded according to the intended recipient). The aggregating unit 12 may be operable to address the polling messages to one of the end stations 14 intended to be the recipient thereof. The frequency at which each polling message is transmitted may be defined relative to a MAP interval or other time marker, which is shown for exemplary purposes since it is a temporal marker used within DOCSIS supported communications.

The end stations 14 are each shown to be polled at frequencies labels to be one of a high rate, medium rate and low rate, and which respectively correspond with polling messages being transmitted every interval, every other interval and every third interval. Of course, the illustrated frequencies are provided for exemplary purposes and any other frequencies may be used without deviating from the scope and contemplation of the present invention. The polling frequency assigned to each end station 14 may vary according to the operation thereof.

One non-limiting aspect of the present invention contemplates varying the polling frequency depending on whether the end station 14 is characterized as being active or inactive. The active/inactive characterization may be based on transmission activities and other operating activities of the end stations 14, such as an elapse time since the last end station last requested data transmission. The elapse time may be compared to a time threshold such that the inactive end stations 14 are those having an elapse time greater than the time threshold and the active end stations 14 are those having an elapse time less than the time threshold. Of course, other characterizations may be used to classify the end stations as being active and inactive.

Optionally, different time thresholds may be used for different ones of the end stations 14, such as depending on the application requirements, service requirements, and network congestion/percent utilization.

The application requirements may relate to an application operating on the end stations 14 and its operational needs, such as whether the application is of the type that requires regular or frequent data transfer (e.g., VoIP, file upload/download, channel surfing) or less frequent data transfer (e.g., web surfing). The applications requiring more frequent download may be assigned a greater time threshold in an effort to increase the time period in which the end stations 14 can be determined to be active based on the assumption that the end station 14 may is more likely to be requesting data transmission due to the nature of the application operating thereon.

The service requirements may relate to a class of service (e.g., business class, residential class), quality of service (QoS) or other level where enhanced quality or responsiveness may be purchased as part of a subscription. The end stations 14 associate with higher classes of service, such as business class, may be provided with a greater time threshold than the lower classes of service in order to increase the time period in which the higher classes of end stations 14 are determined to be active, and thereby, the amount of network space allocated to support the polling operations thereof.

The percent utilization and/or network congestion parameters may be used to adjust the time threshold according to demands on the network 22. The percent utilization and/or network congestions may be measured according to the network space currently being consumed to support data transmission relative to the total amount of network space available to support data transmissions. The resulting influence on the time threshold may include decreasing the time threshold when network demands are low, such as to increase the likelihood that end stations 14 are determined to be active, and in turn, cause greater consumption of unused network space. The time threshold may also be increased when network demands are greater so that it is more difficult for the end stations 14 to be characterized as being active, which in turn would result in less consumption of the unused network space.

The polling frequency of each end station 14 may be set to one of the illustrated rates depending on whether the end station is active or inactive. For example, the active end stations may be set to at least the medium rate and the inactive end stations may be set to the low rate. Optionally, the polling frequency may be further refined, such as by adjusting the polling frequency of the active end stations according to one of the parameters noted above so that the higher quality/service may be used to increase the polling frequency of some of the active end stations 14 to the high rate while the active end stations that did not purchase or request the higher level of service remaining at the medium rate.

The polling frequency of each end station 14, as supported above, may be set according to any number of parameters and historical operating activities, and in some cases, thereafter adjusted according to purchased services or other enhanced levels of agreed to performance. Each of the polling messages and end station responses consume network space such that the corresponding network space must be allocated and the corresponding message(s) must be scheduled for transmit. In this manner, one non-limiting aspect of the present invention contemplates allocating network space, minislots, etc., according the historical transmission activities of the end stations. By dynamically setting the polling frequency of each end station, the aggregating unit 12 is also able to dynamically adjust the network space allocated to support the polling activities.

As shown in FIG. 2, each of the blocks marking transmission of a polling message may also represent network space consumed in making the corresponding transmission (additional block may be similarly included to represent the corresponding end station response messages but are omitted for exemplary purposes). The adjustment of the polling frequencies results in some of the map intervals having more or less message transmissions than the other. This also results in a corresponding allocation of network space and allows the aggregating unit 12 to use the polling frequencies as a mechanism for controlling or otherwise facilitating allocation of network space/resources. In the event networks space becomes limited, the allocation thereof can be controlled by the aggregating unit 12 making corresponding adjustments to the polling frequencies and/or the requirements necessary to fall within one or more of the polling frequency ranges.

FIG. 3 illustrates a flowchart 44 of a multi-tiered polling method in accordance with one non-limiting aspect of the present invention. The method is described with respect to polling operations where the aggregating unit 12 periodically polls the end stations 14 and to which the end stations response with a transmission request if the end stations desires to transmit data over the network 22. The present invention, however, is not necessarily limited to only adjusting polling frequencies and/or allocation of network resources and may similarly apply to other environments where dynamic adjustments are required to manage network space. The aggregating unit 12, end stations 14 and/or some other device in communication therewith may include logic or other processing capabilities necessary to implement the operations contemplated to execute the method of the present invention, such as in the form of executable code stored within a computer readable medium.

Block 46 relates to determining an activity history for each of the end stations 14. The activity history may relate to the last time each end station 14 requested to transmit data and/or to other parameters reflective of a need to imminently support data transfer from the end stations 14, such as but not limited to a scheduling request where the end stations notifies the aggregating unit 12 of a future point in time during which data transmission will be desired. The activity monitor 16 may be configured to monitor activity of each end station 14, or at least the last message/request transmitted therefrom with respect to polling related operations, and to store corresponding messages or flags within a memory. The information logged into the memory may be continuously updated and used to reassess the activity status of each end station.

Block 48 relates to characterizing each of the end stations 14 as being one of active and inactive. The active and inactive designations are intended to demarcate end stations having activities reflective of a need to support greater polling frequencies from end stations 14 having activities reflective of a need to support lesser polling frequencies. As such, the present invention fully contemplates the use of other labels and categories reflective of the end stations data transmission needs and is not intended to be unnecessarily limited to the noted active and inactive determinations. The active determination made in block may correspond with measuring an elapse time since the each end station 14 last indicate a need for data transmission, such as according to the time thresholds described above.

Block 50 sets an inactive frequency for each end stations 14 determined to be inactive. The inactive polling frequency may vary depending on network congestion, service requirements, application requirements, and/or other operating parameters, as described above. The inactive polling frequency may also corresponding with staggering or otherwise offsetting the inactive polling frequency set for each end station 14 so that the polling thereof is spread across the available MAP intervals, for example. The setting of the inactive polling frequency may also be considered to be an act of allocating network space to support the related polling operations, as described above Block 52 sets an active frequency for each end stations determined to be active. The active polling frequency may vary depending on network congestion, service requirements, application requirements, and/or other operating parameters, as described above. The active polling frequency may also corresponding with staggering or otherwise offsetting the active polling frequency set for each end station 14 so that the polling thereof is spread across the available MAP intervals, for example. The setting of the active polling frequency may also be considered to be an act of allocating network space to support the related polling operations, as described above.

Block 56 relates to assessing a need to enhance or otherwise adjust the inactive and active polling frequencies respectively set in Blocks 50, 52. This may occur, for example, in the event one or more of the active and inactive end stations 14 purchased an increased level of service or are otherwise associated with different levels of polling due to some other commitment or request. In the event no adjustment is needed, Block 58 is reached and the set polling frequency is maintained. In the event an adjustment is warranted, Block 60 is reached and the set polling frequency is adjusted. While shown to relate to enhancing, i.e., increasing the active or inactive polling frequencies, a similar operation may take place in the opposite directions, such as if network congestion increases or the end stations change applications.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention. The features of various implementing embodiments may be combined to form further embodiments of the invention.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. A non-transitory computer-readable medium having a plurality of non-transitory instructions executable with a processor to facilitate dynamically managing bandwidth allocated to end stations desiring to transmit data, the non-transitory instructions being sufficient to facilitate:
    monitoring data transmission activities of the plurality of end stations;
    logging information reflective of the monitored data transmission activities;
    individually characterizing each end station to be one of active and inactive based on the logged information;
    determining a bandwidth available to facilitate polling the end stations;
    allocating a first amount of the bandwidth to support polling for a first plurality of end stations characterized as being inactive;
    allocating a second amount of the bandwidth to support polling for a second plurality of end stations characterized as being active, the second amount being greater than the first amount.

2. The non-transitory computer-readable medium of claim 1 further comprising non-transitory instructions for individually characterizing the plurality of end stations to be active and inactive depending an elapse time since each end station last transmitted a transmission request, the active characterization corresponding with the elapse time being less than a time threshold and the inactive characterization corresponding with the elapse time being equal to or greater than the time threshold.

3. The non-transitory computer-readable medium of claim 2 further comprising non-transitory instructions for:
    determining network congestion; and
    setting the time threshold at a first threshold when the network congestion is at a first level and at a second threshold when the network congestion is at a second level, the second threshold being greater than the first threshold.

4. The non-transitory computer-readable medium of claim 2 further comprising non-transitory instructions for:
    determining application requirements for each end station to be one of frequent data transfer and less frequent data transfer; and
    setting the time threshold individually for each end station to be one of a first threshold and a second threshold depending on the application requirements of each end station, the first threshold being set when the application requirements require frequent data transfer and the second threshold being set when the application requirements require less frequent data transfer, the second threshold being greater than the first threshold.

5. The non-transitory computer-readable medium of claim 2 further comprising non-transitory instructions for:
    determining service requirements for each end station to be one of business service and residential service; and
    setting the time threshold individually for each end station to be one of a first threshold and a second threshold depending on the service requirements of each end station, the first threshold being set when the service requirements are for business service and the second threshold being set when the service requirements are for residential service, the second threshold being greater than the first threshold.

6. The non-transitory computer-readable medium of claim 2 further comprising non-transitory instructions for:
    determining percent utilization of a network used to transfer data from the end stations to be one of a first level and a second level; and
    setting the time threshold individually to be one of a first threshold and a second threshold depending on the percent utilization, the first threshold being set when the percent utilization is at the first level and the second threshold being set when the percent utilization is at the second level, the second threshold being greater than the first threshold.

7. The non-transitory computer-readable medium of claim 1 further comprising non-transitory instructions for:
    determining a percent utilization of a network used to transfer data from the end stations; and
    selecting the second amount to be one of a first value when the percent utilization is less than a percent utilization threshold and a second value when the percent utilization is equal to or greater than the percent utilization threshold, the first value being less than the second frequency.

8. The non-transitory computer-readable medium of claim 1 further comprising non-transitory instructions for:
    determining a percent utilization of a network used to transfer data from the end stations; and
    selecting the first amount to be one of a first value when the percent utilization is less than a percent utilization threshold and a second value when the percent utilization is equal to or greater than the percent utilization threshold, the first value being less than the second value.

9. The non-transitory computer-readable medium of claim 1 further comprising non-transitory instructions for:
    determining application requirements for each of the second plurality of end station to be one of frequent data transfer and less frequent data transfer; and
    selecting the second amount individually for each of the second plurality of end station to be one of a first value when the application requirement is frequent data transfer and a second value when the application requirement is less frequent data transfer, the second frequency being greater than the first frequency.

10. The non-transitory computer-readable medium of claim 1 further comprising non-transitory instructions for:
    determining a class of service for each of the second plurality of end stations to be to one of higher class and lower class; and
    setting the second amount for a first portion of the second plurality of end stations having the higher class of service to be a first value and a second portion of the second plurality of end stations having the lower class of server to be a second value, the second value being less than the first frequency.

11. The non-transitory computer-readable medium of claim 1 further comprising non-transitory instructions for:
    characterizing a third plurality of the end stations to be moderately active; and
    allocating a third amount of the bandwidth for a third plurality of end stations characterized as being moderately-active, the third amount being greater than the first amount and less than the second amount.

12. The non-transitory computer-readable medium of claim 1 further comprising non-transitory instructions for:
    setting an inactive polling frequency for the first plurality of end stations; and setting an active polling frequency for the second plurality of end stations, the active polling frequency being more frequent than the inactive polling frequency.

13. An aggregating unit having a non-transitory computer-readable medium with a plurality of executable, non-transitory instructions, when executed by a processor, sufficient to facilitate allocating data units of a transmission channel used to support polling of end stations, the end stations being characterized as one of active and inactive, the non-transitory instructions being sufficient to facilitate:
   allocating a first number of data units to support polling of a first plurality of the end stations characterized as being inactive; and
   allocating a second number of data units to support polling of a second plurality of the end stations characterized as being active, the second number of data units being greater than the first number of data units.

14. The non-transitory computer-readable medium of claim 13 further comprising non-transitory instructions for:
   determining service requirements of the second plurality of the end stations to be one of a first level and a second level;
   allocating a second portion of the second number of data units to support polling of the second plurality of end station having service requirements of the first level; and
   allocating a second portion of the second number of data units to support polling of the second plurality of end station having service requirements of the second level, the first portion being greater than the second portion.

15. The non-transitory computer-readable medium of claim 13 further comprising non-transitory instructions for determining the first number and the second number of data units in proportion to a usage percentage of the transmission channel such that a total number of data units, defined as the sum of the first number and the second number, increases when the usage percentage decreases and decreases when the usage percentage increases.

16. The non-transitory computer-readable medium of claim 13 further comprising non-transitory instructions for:
   setting an inactive polling frequency for the first plurality of end stations; and
   setting an active polling frequency for the second plurality of end stations, the active polling frequency being greater than the inactive polling frequency.

17. The non-transitory computer-readable medium of claim 13 further comprising non-transitory instructions for determining the end stations to be active in the event an elapse time since issuing a data transmission request is greater than a time threshold and to be inactive in the event the elapse time is equal to or greater than the time threshold.

18. A computer program product embedded in a non-transitory computer readable medium, the medium storing instructions for allocating minislots of a transmission channel used to support polling a plurality of end stations, the medium including non-transitory instructions, when executed by a processor, sufficient for:
   logging transmission activities of the plurality of end stations;
   characterizing each end station to be one of active and inactive based on the logged transmission activities;
   allocating a first number of the minislots to a first plurality of the plurality of end stations characterized as being inactive to facilitate polling the first plurality at a first frequency;
   allocating a second number of the minislots to a second plurality of the plurality of end stations characterized as being active to facilitate polling the second plurality at a second frequency, the second number of minislots being greater than the first number of minislots and the second frequency being greater than the first frequency.

19. The computer program product of claim 18 further comprising non-transitory instructions sufficient for:
   after polling a first end station of the first plurality characterized as being inactive, updating the transmission activities logged for the first end station; and thereafter:
   i) polling the first end station at the first frequency when the updated transmission activities characterize the first end station as being inactive; and
   ii) polling the first end station at the second frequency when the updated transmission activities characterize the first end station as being active.

20. The computer program product of claim 18 further comprising non-transitory instruction sufficient for polling the first and second plurality of end stations with a corresponding plurality of polling messages, each polling message being addressed to an individual one of the first and second plurality of end stations such that the first and second plurality of end stations ignore the polling messages addressed to other ones of the first and second plurality of end stations, the first and second plurality of end stations being required to transmit a transmission request in response to receipt of a corresponding one of the polling messages in order to transmit over a network associated with the transmission channel.

* * * * *